United States Patent [19]

Morikawa et al.

[11] Patent Number: 5,410,640
[45] Date of Patent: Apr. 25, 1995

[54] FONT MANAGEMENT SYSTEM

[75] Inventors: Takashi Morikawa; Yoshikazu Ikenoue, both of Toyohashi, Japan

[73] Assignee: Minolta Camera Kabushiki Kaisha, Osaka, Japan

[21] Appl. No.: 216,515

[22] Filed: Mar. 23, 1994

Related U.S. Application Data

[63] Continuation of Ser. No. 902,858, Jun. 23, 1992, abandoned.

[30] Foreign Application Priority Data

Jun. 26, 1991 [JP] Japan .................................. 3-182905

[51] Int. Cl.⁶ ............................................ G06F 15/00
[52] U.S. Cl. .................................... 395/110; 395/117
[58] Field of Search ............... 395/110, 115, 150, 151, 395/112, 117; 358/467, 470, 300; 400/69, 72; 345/141–143

[56] References Cited

U.S. PATENT DOCUMENTS 4,686,525 8/1987 Nagata ................................. 340/790
4,953,033 8/1990 Sakamoto ............................ 358/300
5,167,013 11/1992 Hube et al. .......................... 395/110

Primary Examiner—Arthur G. Evans
Attorney, Agent, or Firm—Burns, Doane, Swecker & Mathis

[57] ABSTRACT

A font management system includes a font memory for storing a plurality of fonts each having a plurality of attributes and a system RAM containing a priority register table. The font memory has a receiving buffer in which is stored a font selection code transmitted from a host computer. The font selection code contains attribute information and is used to select a single font from among the plurality of the fonts. The system further includes a central control operation unit, in which the attribute information contained in the font selection code is compared with attribute information stored in the font memory in the order of priorities of the fonts stored in the system RAM. The system can select a desired font having attribute information in agreement with the attribute information contained in the font selection code at a high speed.

10 Claims, 14 Drawing Sheets

Fig.14

ATTRIBUTE GROUP TABLE

| N | ATTRIBUTE | PARA. |
|---|---|---|
| 1 | FONT TYPE | MONO |
| | FONT POINT SIZE | 8~12 |
| | FONT SET | ROMAN-8 |
| | FONT TYPE FACE | COURIER |
| 2 | FONT TYPE | PS |
| | FONT POINT SIZE | 10~24 |
| | FONT SET | 0 |
| | FONT TYPE FACE | 0 |
| 3 | FONT TYPE | MONO |
| | FONT POINT SIZE | 10 |
| | FONT SET | USASCII |
| | FONT TYPE FACE | 0 |
| ⋮ | ⋮ | ⋮ |
| m | | |
| | | |
| | | |
| | | |

PRI. REG. TABLE

| ATTRIBUTE GROUP NO. | REG. PRI. |
|---|---|
| 2 | n−1 |
| 4 | n−2 |
| 3 | n−1 |
| 6 | n−3 |
| 0 | 0 |
| | |
| 0 | 0 | and

FONT MANAGEMENT SYSTEM

This application is a continuation of application Ser. No. 07/902,858, filed Jun. 23, 1992, now abandoned.

BACKGROUND OF THE INVENTION

1. Field of the Invention

The present invention relates to a font management system for use in a character image generator such as, for example, a printer having plural kinds of fonts.

2. Description of the Prior Art

Character image generators such as printers having plural kinds of fonts are in wide practical use today. Font memories being frequently used are accommodated in advance as standard font memories in such apparatus whereas other font memories being used at a comparatively low frequency are prepared as ROM cartridges, IC cards or the like. The latter font memories are mounted in the apparatus as occasion demands.

The character image generators, however, cannot receive a number of fonts at the same time for the use thereof. Also, replacement of the ROM cartridges or the like takes time. Because of this, with the spread of large-capacity ROMs, character image generators accommodating a large-capacity ROM as a standard memory are proposed in which a number of fonts are stored in advance.

In applications where plural kinds of fonts are accessible during the use of a printer or the like, attribute information of all the accessible fonts is compared with that of a font specified by a font selection signal for the selection of an appropriate font. The same is true for a printer having a large-capacity ROM in which a number of fonts are stored as standard fonts. The aforementioned comparison processing is executed with respect to all the attribute information of a number of fonts stored in the ROM.

In the present situation, however, a CPU for executing the comparison processing cannot comply therewith in processing speed. In other words, the processing speed reduces and the comparison processing takes a great deal of time.

SUMMARY OF THE INVENTION

The present invention has been developed to overcome the above-described disadvantages.

It is accordingly an object of the present invention to provide a font management system capable of selecting an appropriate font from among plural kinds of accessible fonts at a high speed.

In accomplishing this and other objects, a font management system according to the present invention comprises a first storage means for storing a plurality of fonts each having a plurality of attributes, a second storage means for storing a priority imparted to each of the fonts, and a reception means for receiving a font selection signal required to select a single font from among the plurality of the fonts, wherein the font selection signal contains attribute information. The font management system further comprises a comparison means for comparing the attribute information contained in the font selection signal with attribute information stored in the first storage means in the order of priorities of the fonts stored in the second storage means, and a selection means for selecting, as a result of a comparison by the comparison means, from the first storage means a font having attribute information in agreement with the attribute information contained in the font selection signal.

The font management system may comprise a designation means for designating some fonts from among the plurality of the fonts. In this case, the priority imparted to each of the fonts designated by the designation means is preferably stored in the second storage means. The font management system may comprise a retrieval means for retrieving attribute information in agreement with the attribute information contained in the font selection signal.

In another aspect of the present invention, a font management system comprises a first storage means for storing a plurality of fonts each having a plurality of attributes, a classification means for classifying the plurality of fonts into a plurality of groups, and a priority imparting means for imparting a priority to each group classified by the classification means. In this case also, the font management system comprises a reception means, a comparison means, and a selection means.

The font management system according to the present invention limits accessible fonts according to their applications and sets priorities in retrieving the limited fonts.

BRIEF DESCRIPTION OF THE DRAWINGS

This and other objects and features of the present invention will become more apparent from the following description of a preferred embodiment thereof with reference to the accompanying drawings, throughout which like parts are designated by like reference numerals, and wherein:

FIG. 14 is a schematic view explanatory of an attribute group table stored in a ROM shown in FIG. 1;

DETAILED DESCRIPTION OF THE PREFERRED EMBODIMENTS

Figure 1:
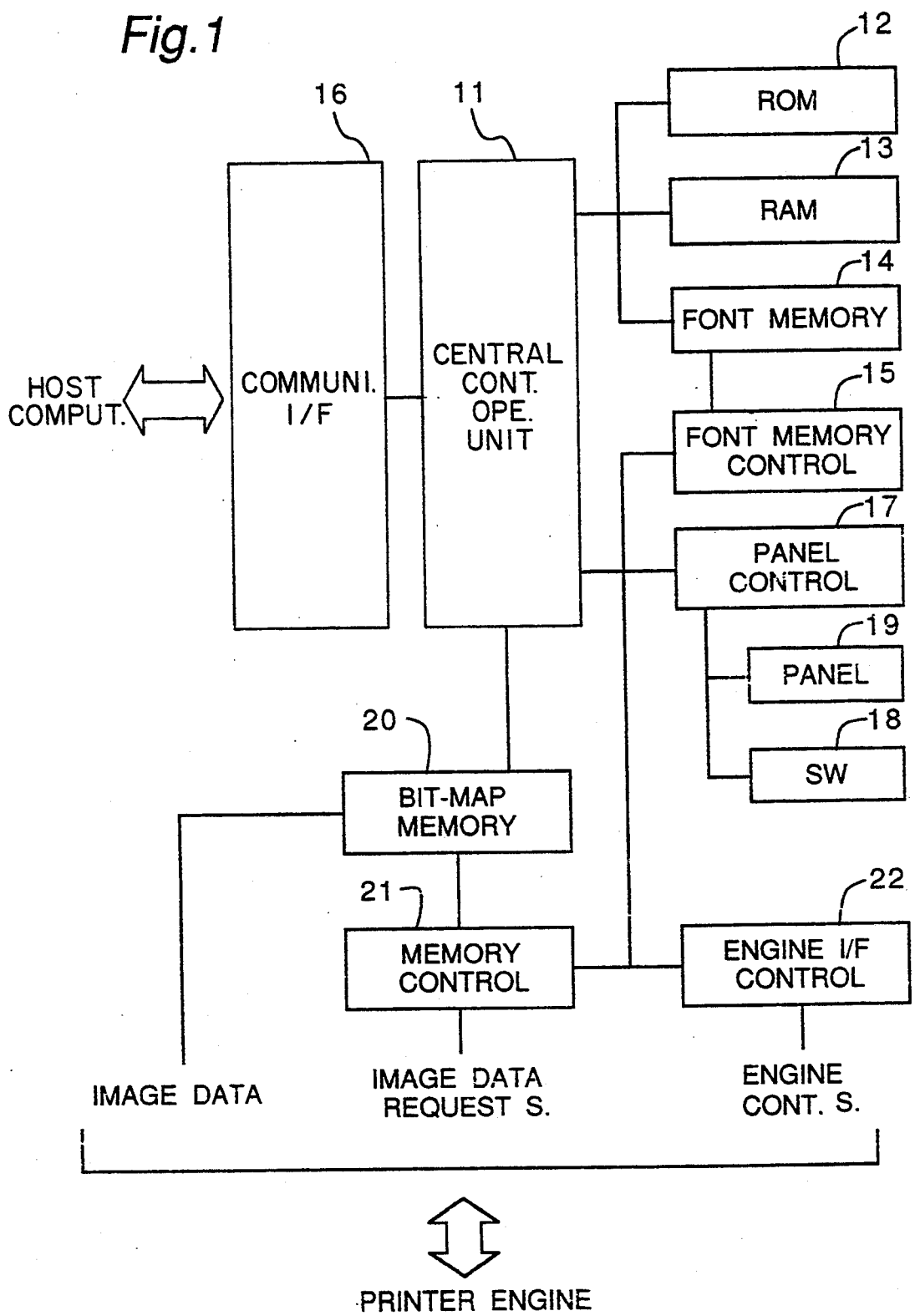
FIG. 1 is a block diagram of a font management system according to the present invention.
Figure 2:
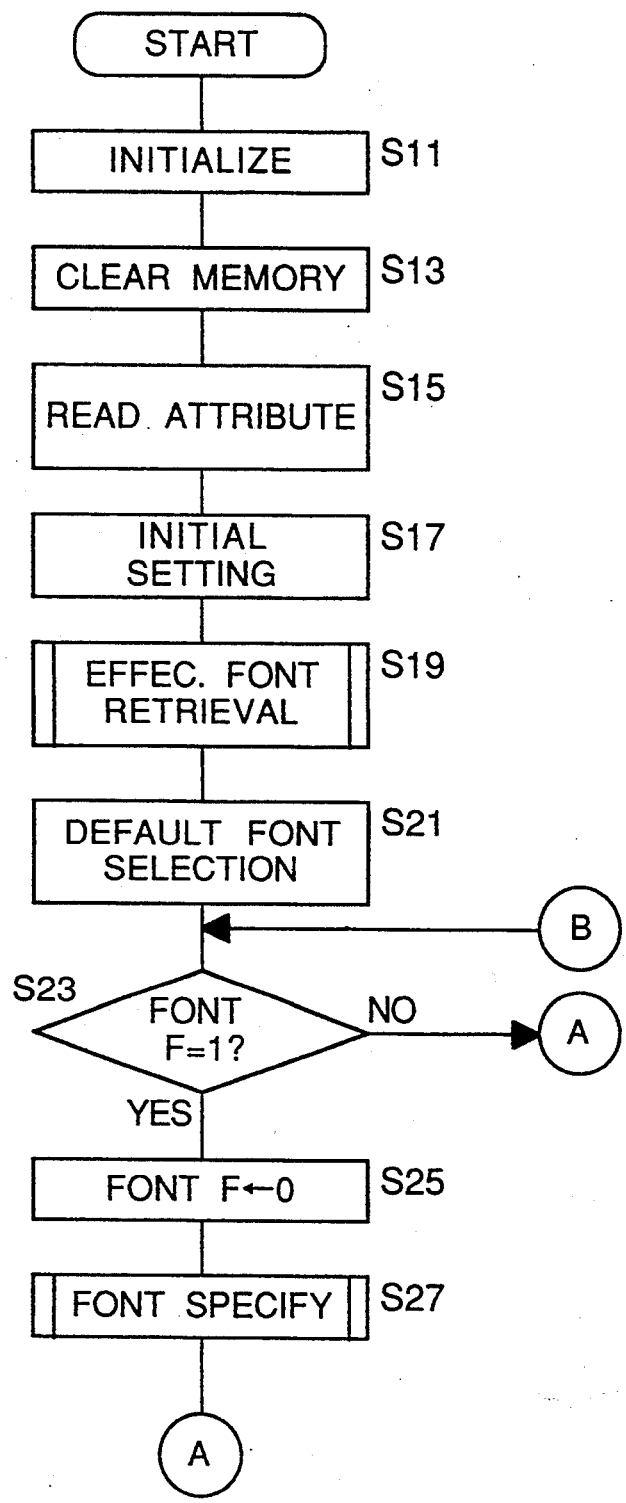
FIGS. 2 and 3, when combined, show a flow-chart indicative of the main routine to be processed in a central control operation unit shown in FIG. 1.
Figure 3:
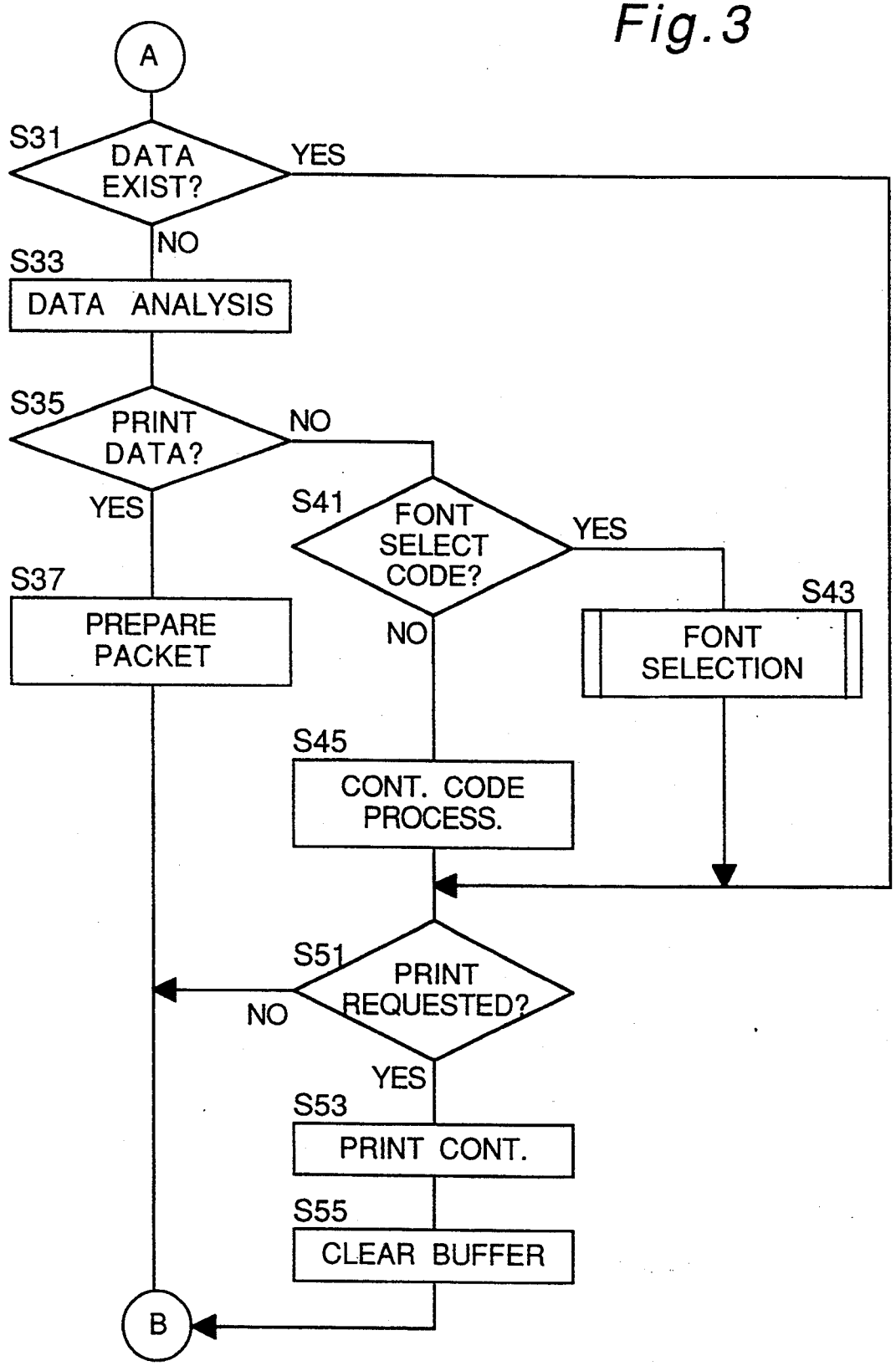

Referring now to the drawings, a font management system according to one preferred embodiment of the present invention is discussed hereinafter.

(1) System Organization and Operation:

As shown in FIG. 1, the font management system of the present invention comprises a central control operation unit 11, a ROM 12, a memory unit (system RAM) 13, a font memory 14, a font memory management control unit 15, and a communication I/F 16. All the ROM 12, the memory unit 13, the font memory 14, the font memory management control unit 15, and the communication I/F 16 are coupled with the central control operation unit 11. The font memory 14 and the font memory management control unit 15 are coupled with each other. The font management system further comprises an operation panel management control unit 17, external input switches 18, an operation panel 19, a bit-map memory 20, a bit-map memory management control unit 21, and a printer engine I/F control unit 22. The operation panel management control unit 17, the bit-map memory 20, the bit-map memory management control unit 21, and the printer engine I/F control unit 22 are coupled with the central control operation unit 11. The external input switches 18 and the operation panel 19 are coupled with the operation panel management control unit 17. The bit-map memory management control unit 21 is coupled with the bit-map memory 20 and with the printer engine I/F control unit 22.

The font management system having the above-described construction is coupled with a host computer (not shown) via the communication I/F 16. The system prepares image data required for image formation on the bit-map memory 20 in compliance with code data (control code, print code) transmitted from the host computer and outputs them along with control signals to a printer engine.

Figures 15, 16:
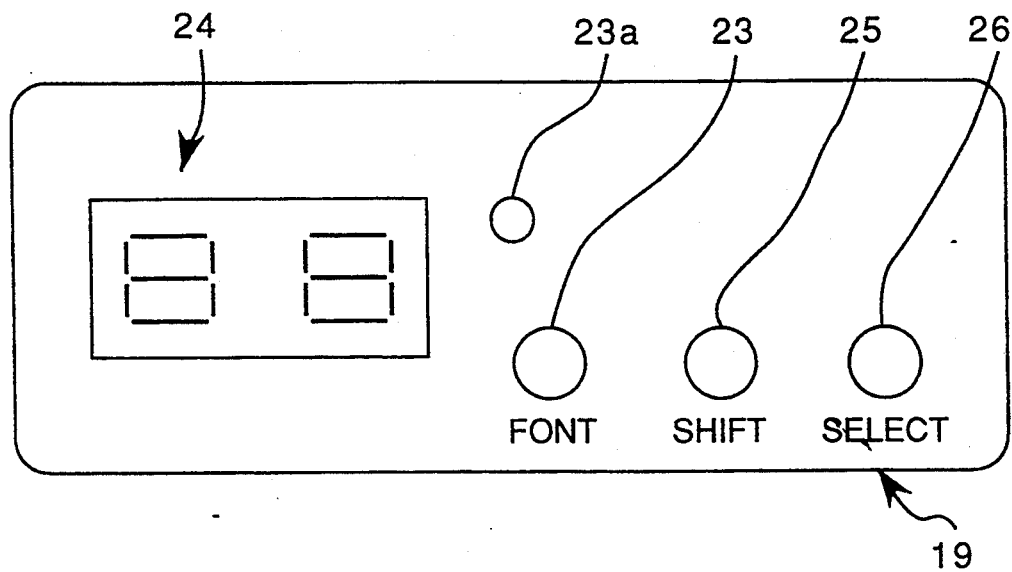
FIG. 15 is a top plan view of an operation panel shown in FIG. 1.
FIG. 16 a schematic view of a memory map of a priority register table stored in the memory unit.

FIGS. 2 through 11 show processings to be executed by the central control operation unit 11. For example, a priority register table as shown in FIG. 16 is prepared in accordance with the designation by a DIP switch, the default, or key inputs, thus specifying the attribute group number and the register priority. Parameters of a font listed on an attribute group table and designated by the attribute group number are compared with those of each font listed on a font management table (FCB). As a result, effective font flags of the fonts retrieved, which have parameters coincident with those of the font designated, are set to "1", and respective FCB priorities are determined. From among the fonts each having "effective font flag=1", the fonts coincident with a font selection code sent from the host computer are sequentially retrieved in the order of their FCB priorities so that an appropriate one may be selected. Such processings are discussed later in detail.

In the ROM 12 are stored control programs and an attribute group table shown in FIG. 14. Attributes or the like of the usable fonts are stored in the attribute group table. The attribute group table is a table for use in classifying the fonts according to respective attributes. For example, fonts classified into Group 1 in the table of FIG. 14 have a font type "MONO" (all font characters contained in each font have dots with the same width), font point sizes in the range of 8–12, a font set "ROMAN-8", and a font type face "COURIER". It is generally conceivable that plural kinds of fonts satisfying such conditions exist. Furthermore, each font may belong to two or more groups. In the attribute conditions, the attribute to which is set "0" is not limited to a specified attribute but may be any attribute.

Figure 13A:
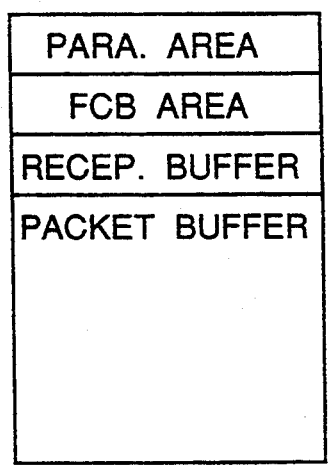
FIG. 13 is a schematic view of a memory map indicative of the organization of a memory unit shown in FIG. 1.
Figure 13B:
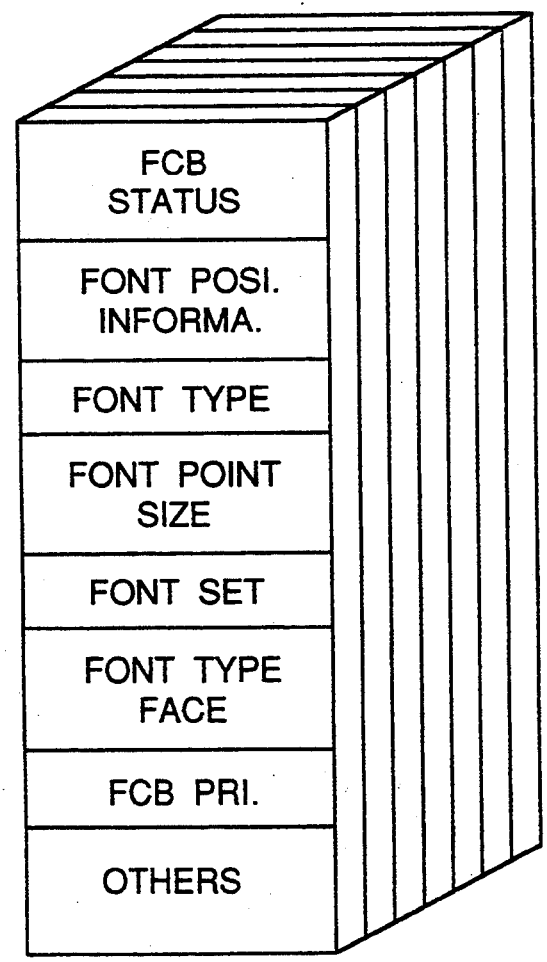

The memory unit 13 consists of a receiving buffer for storing data received from the host computer, a packet buffer for storing prints data converted to an intermediate code (packet) readily processable for plotting, and a system area for working use. The system area consists of a parameter area including the priority register table (FIG. 16) or the like and an FCB area, as shown in FIG. 13. The priority register table is a table to store the priority to be imparted to each font. In this embodiment, the priority is set in compliance with attribute group numbers (1–m) in the attribute group table.

The external input switches 18 are placed outside the operation panel 19, and the DIP switch for initialization is one of the external input switches 18.

As shown in FIG. 15, the operation panel 19 is provided with a font key 23 for instructing the setting/cancellation of a specified font mode, an LED 23a which lights up at the time the specified font mode is set, a decimal display 24, a shift key 25 for shifting the numerical value (the font number, the numerical value corresponding to the priority) indicated in the specified font mode by "1" at a time, and a selection key 26 for determining the numerical value flickering in the specified font mode as the attribute group number or the register priority.

The function of the font memory management control unit 15, the operation panel management control unit 17, the bit-map memory management control unit 21, and the printer engine I/F control unit 22 is discussed later with reference to FIGS. 2 through 11.

(2) Processing in Central Control Operation Unit 11:
(2-1) Main Routine (FIGS. 2 and 3):

In the central control operation unit 11, the processing starts upon turning on a power source. First, initialization is performed with respect to peripheral circuits and a CPU (step s11). Next, the memory unit 13 and the bit-map memory 20 are cleared (step s13), and the attribute of each font is read out of the font memory 14 and is recorded on the system area of the memory unit 13 (step s15). Then, the initial setting is performed in compliance with the designation by the DIP switch and the default (step s17). In the case where the attribute group number is designated by the DIP switch, the attribute group number is registered on the priority register table (FIG. 16) of the memory unit 13.

Step s19 executes an effective font retrieval processing. More specifically, according to the initial setting performed at step s17 above, parameters of the fonts listed on the attribute group table (FIG. 14) and indicated by the attribute group number registered on the priority register table (FIG. 16) are successively compared with those of each font listed on the font management table (FCB; FIG. 13). The effective font flags of the fonts retrieved (the fonts having parameters coincident with those of the font designated) are set to "1" and the register priority of the priority register table is substituted for the FCB priority. The effective font retrieval processing is discussed later.

At step s21, the attributes of the fonts of which respective effective font flags have been set to "1" at step s19 are compared with the default setting for the selection of appropriate fonts in conformity with the default setting. Thereafter, an iterative routine from step s23 to step s55 is executed.

(i) The case where the font flag=0

Until the font flag is set to "1" by the input operation of the font key 23 at step s23 (refer to FIG. 4d), steps s25 and s27 are not executed. Because the data in the priority register table (FIG. 16) are not changed by the font specifying processing (step s27), the effective font flag is not reset. Accordingly, the fonts of which respective effective font flags have been set to "1" at step s19 can still be selected.

Step s31 determines whether data transmitted from the host computer are stored in the receiving buffer. If the data exist in the receiving buffer (step s31:NO), data analysis is executed (step s33). As a result of the data analysis, if the data are print data (step s35:YES), a packet is prepared which is an intermediate code readily processable for the plotting thereof into the bit-map memory 20 (step s37). This packet is stored in the packet buffer. In contrast, if the data are indicative of a control code and not a font selection code (step s35:NO and step s41:NO), a control code processing is executed (step s45).

If the data are indicative of a font selection code (step s35:NO and step s41:YES), a font selection processing is selected (step s43). In the font selection processing, from among the fonts having "effective font flag=1", the fonts which agree with the conditions of the font selection code are selected in the order of the FCB priority. Hereupon, the fonts of which respective effective font flags have been set to "1" at step s19 are selected. The font selection processing is discussed later.

If the control code is a print request code (step s51:YES), a print control processing is executed (step s53). Thereafter, the bit-map memory 20 and the packet buffer are cleared (step s55). In the print control processing (step s53) is performed transmission/reception of a control signal to and from the printer engine, plotting of image data to the bit-map memory 20, transmission of the image data to the printer engine or the like. As a result, the printer engine executes a print sequence processing of which the explanation is omitted here because this processing is conventionally known.

(ii) The case where the font flag=1

If "font flag=1" by the input operation of the font key 23 (step s23:YES), steps s25 and s27 are executed and the above-discussed processings after step s31 are also executed. More specifically, the data (attribute group number, register priority) on the priority register table are rewritten in the font specifying processing (step s27). Based on the new data, the effective font flag and the FCB priority are reset, and thereafter, the processing after step s31 is executed.

Accordingly, in this case, the font selection processing (step s43) is executed based on the data altered at step s27. The processings except step s43 are the same as those executed when "font flag=0".

(2-2) Font Specifying Processing (FIGS. 5 through 7):

The font specifying processing (step s27) is executed when the font flag is set to "1" by the operation of the font key 23 (step s23:YES). Prior to the font specifying processing, the font flag is reset to "0" (step s25).

Initially, the LED 23a indicative of a font specifying mode is turned on (step s201), and the priority register table of the memory unit 13 is cleared (step s203). The numerical data being displayed on the decimal display 24 are stored in the memory unit 13 (step s205).

Next, an initial value "1" is substituted in a variable N indicative of the font number (step s211). The shifting of the variable N and the determination of the font number (attribute group number) N to be recorded on the priority register table are performed in compliance with the input operation of the shift key 25 and the selection key 26 (steps s213 through s225, steps s251 through s259).

Furthermore, an initial value "1" is substituted in a variable L indicative of the register priority (step s231). The shifting of the variable L and the determination of the register priority "n−L" to be recorded on the priority register table are performed in compliance with the input operation of the shift key 25 and the selection key 26 (steps s233 through s243).

Thereafter, when the input operation of the font key 23 resets the font flag to "1" again (step s251:YES), the font flag is reset (step s261), and the numerical data stored in the memory unit 13 at step s205 are read out and displayed on the decimal display 24 again (step s263). At this moment, the LED 23a indicative of the font specifying mode is turned off (step s265) and an effective font retrieval processing is executed (step s267). The effective font retrieval processing is discussed later.

The shifting of the variable N and the determination of the attribute group number N, and the shifting of the variable L and the determination of the register priority "n−L" are executed as follows.

(Attribute Group Number N)

When the initial value "1" is substituted in the variable N (step s211), the system is ready to receive a signal from the shift key 25. In the case where the value of the variable N (initial value=1) is not registered on the priority register table (step s213:NO), this value flickers on the decimal display 24 (step s215) and the system is ready to receive the signal from the shift key 25 and that from the selection key 26.

Figure 4A:
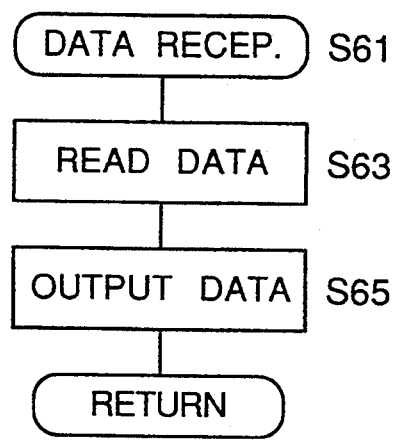
FIGS. 4a through 4d are flow-charts indicative of interruption routines.
Figure 4B:
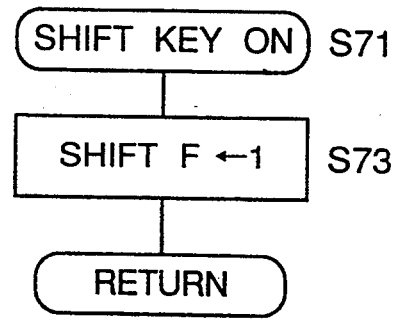

During the stand-by condition for the input of the shift key 25, when the signal from the shift key 25 is inputted and the shift flag is set to "1" (step s253:YES), as shown in FIG. 4b, the shift flag is reset (step s255) and the value of the variable N is incremented by "1" (step s257). However, when the value of the variable N exceeds the total record number "m" of the attribute group table (step s259:YES), the variable N is set to its initial value "1" again (step s211). In this way, the variable N is incremented by "1" whenever the shift key 25 is operated.

Figure 4C:
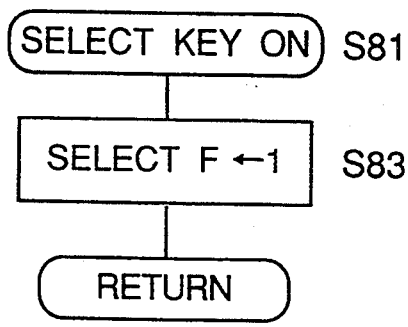
Figure 4D:
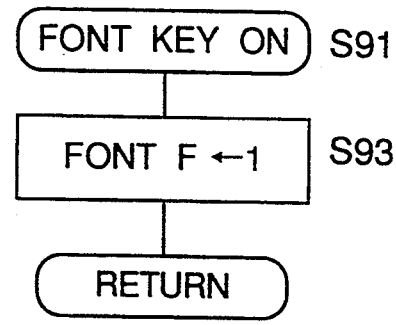
Figure 5:
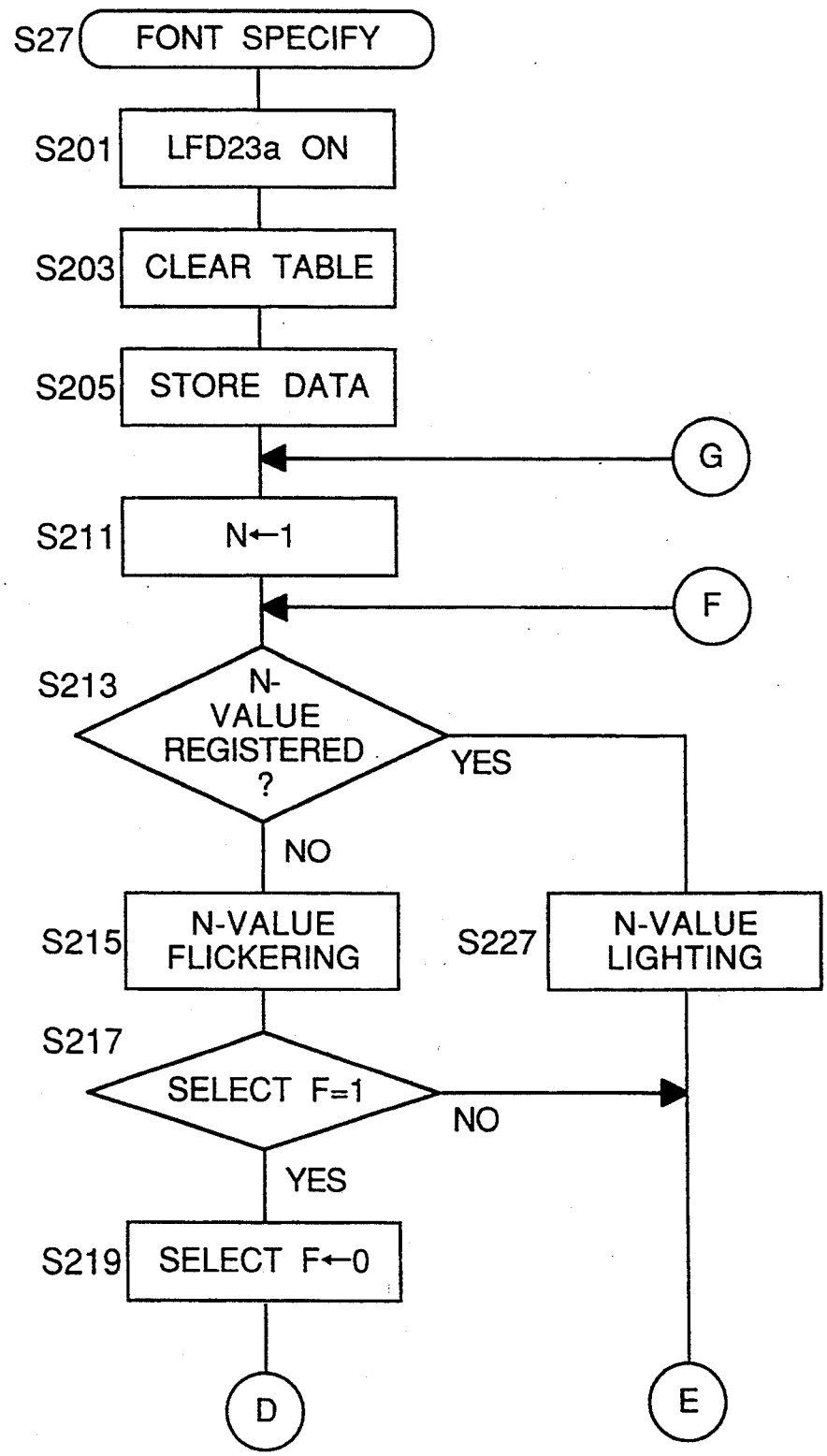
FIGS. 5 through 7, when combined, show a flow-chart indicative of a font specifying processing to be executed in the main routine.
Figure 6:
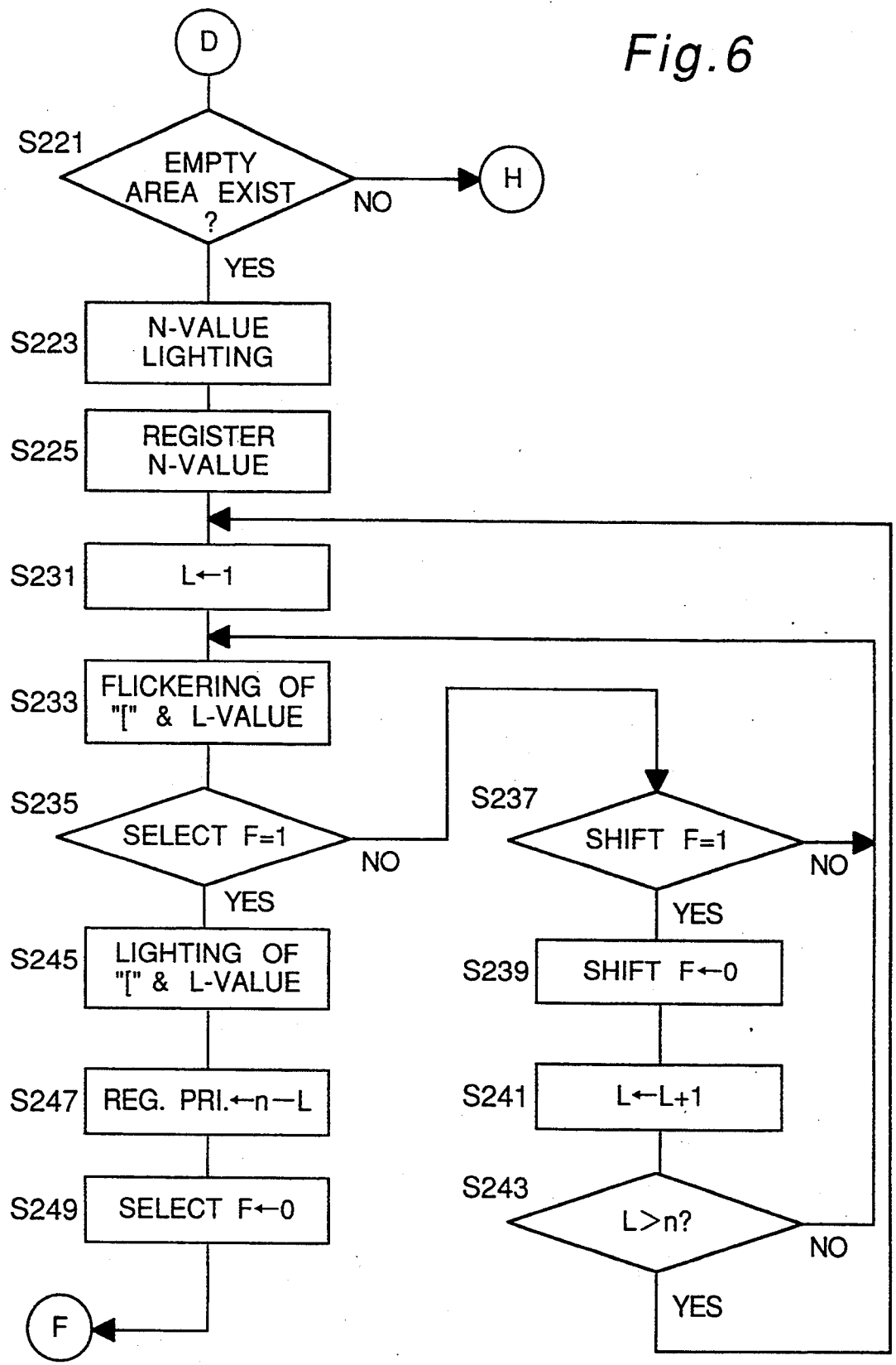
Figure 7:
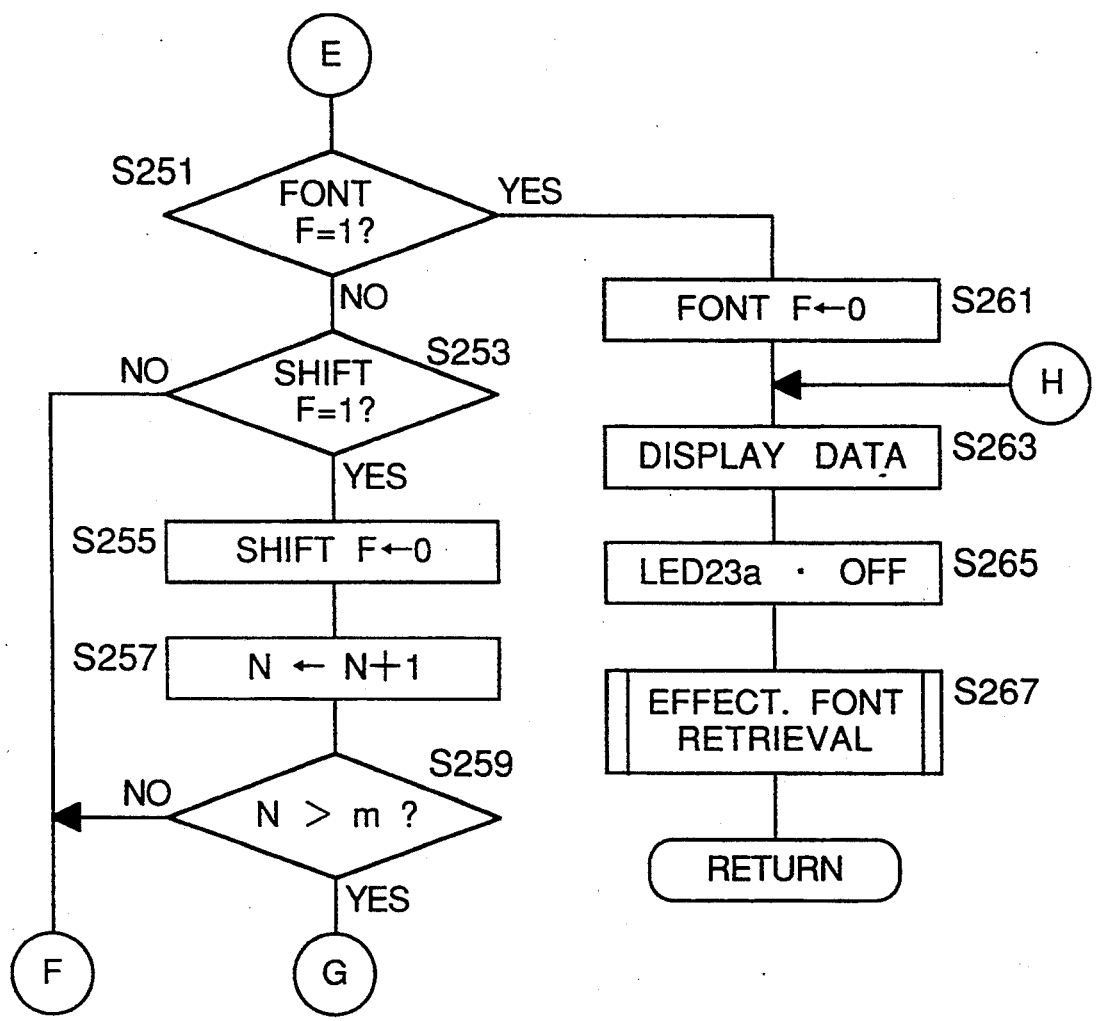
Figure 8:
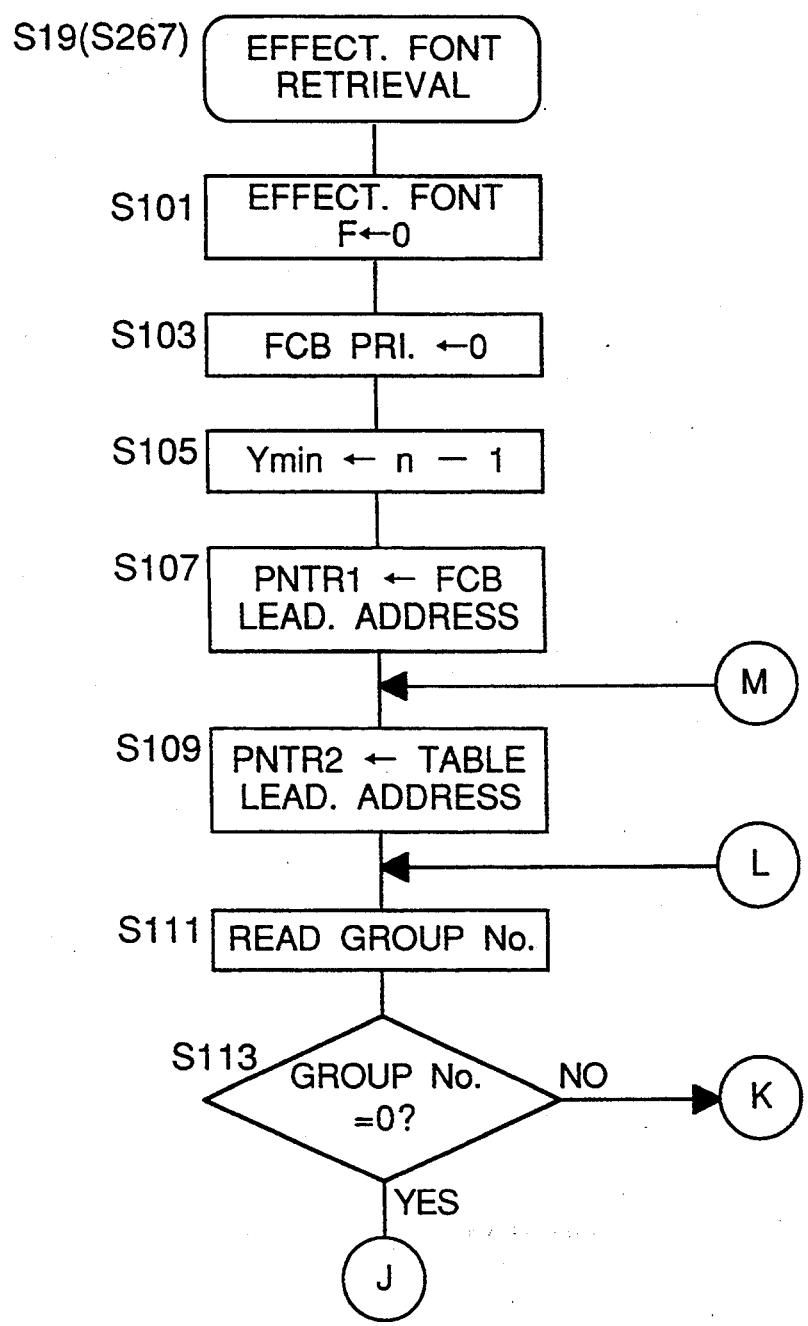
FIGS. 8 and 9, when combined, show a flow-chart indicative of an effective font retrieval processing to be executed in the font specifying processing.
Figure 9:
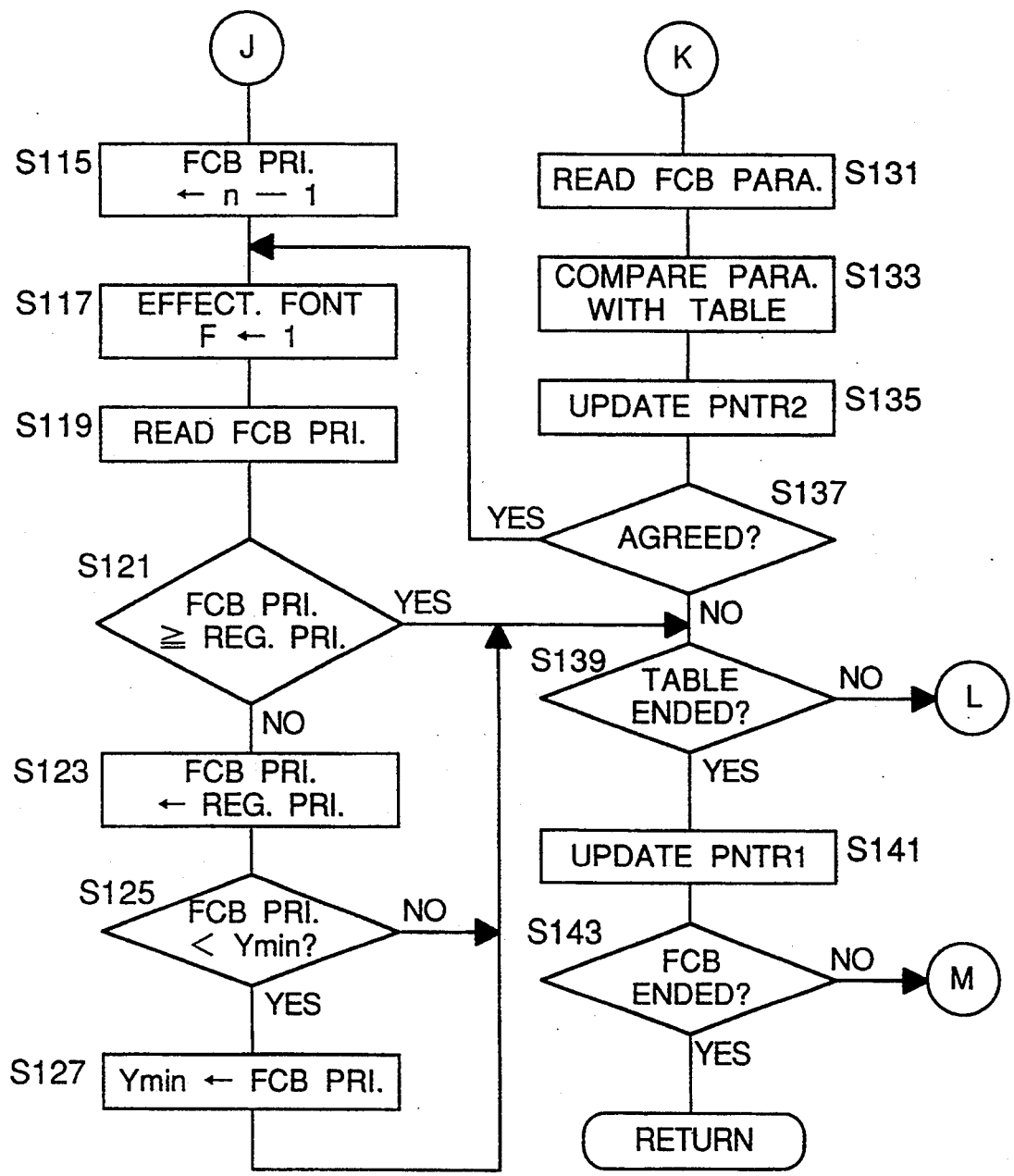
Figure 10:
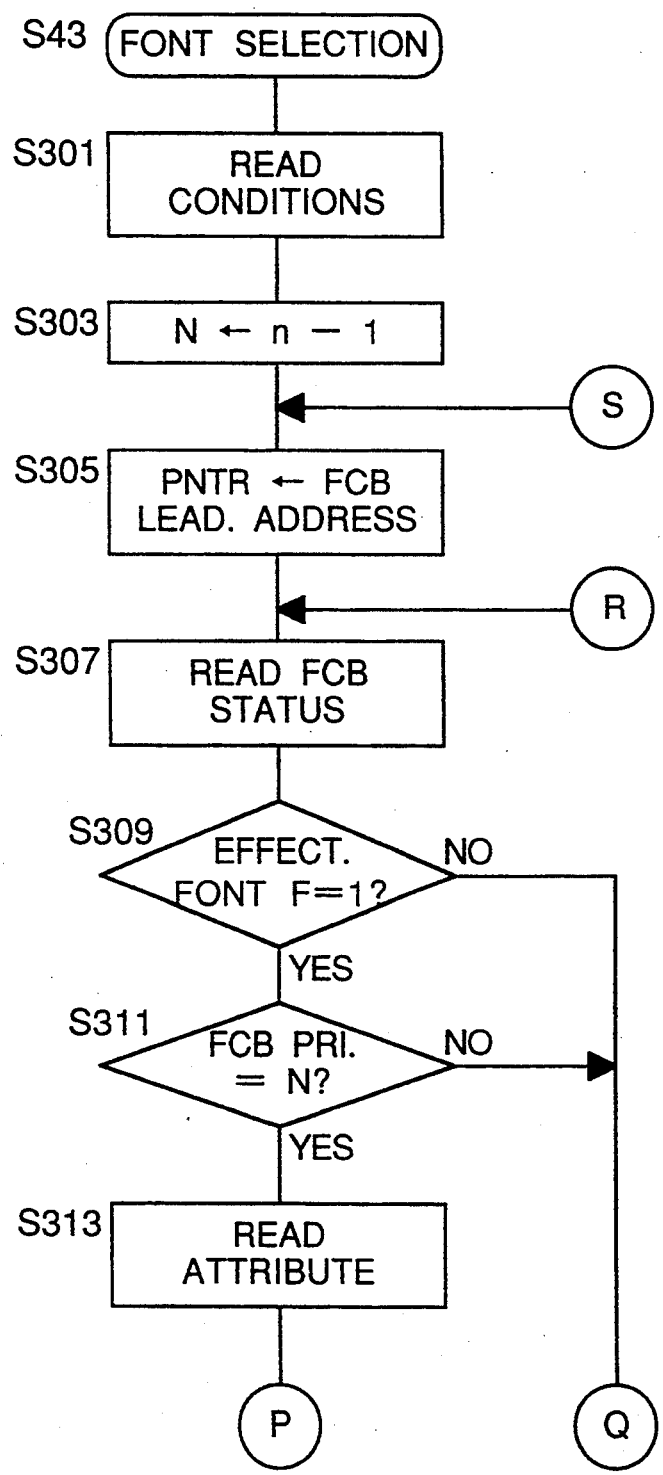
FIGS. 10 and 11, when combined, show a flow-chart indicative of a font selection processing to be executed in the main routine.
Figure 11:
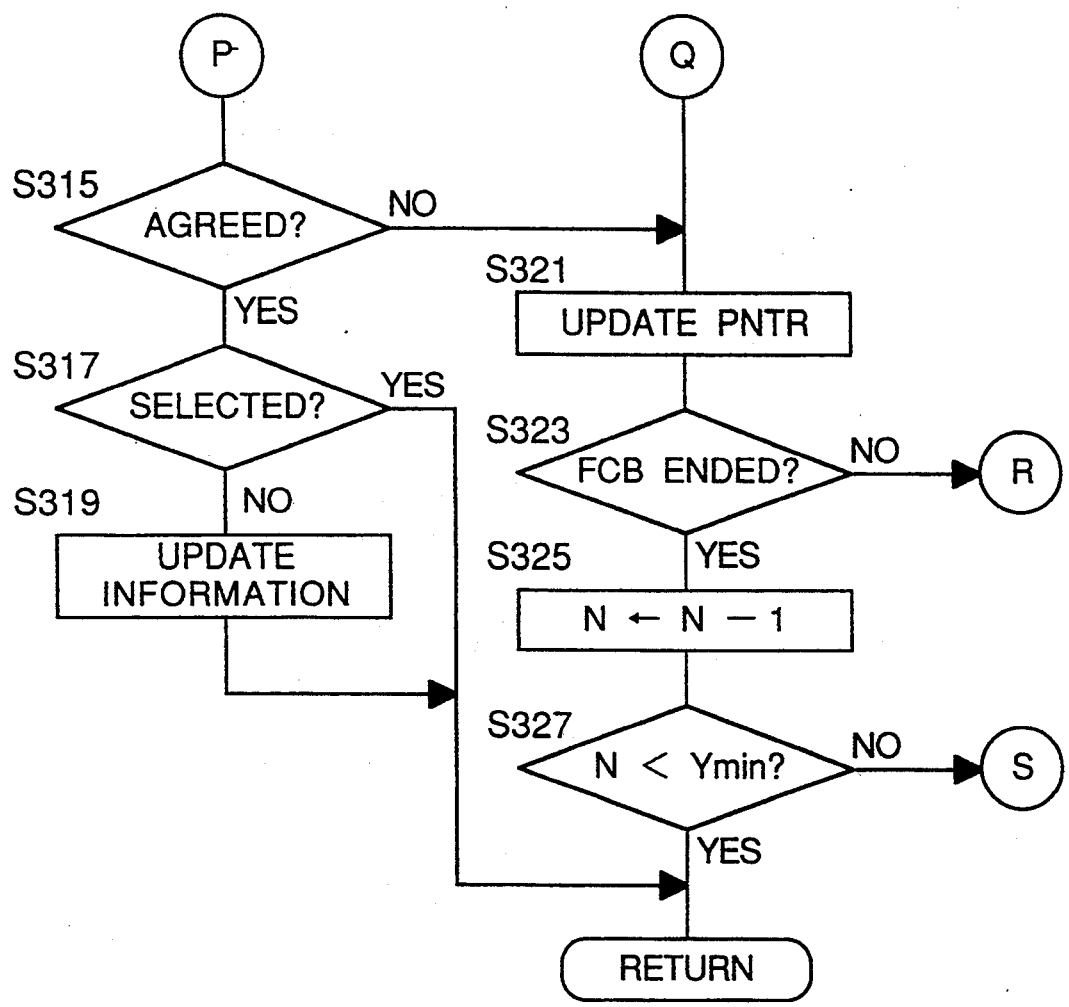
Figure 12:
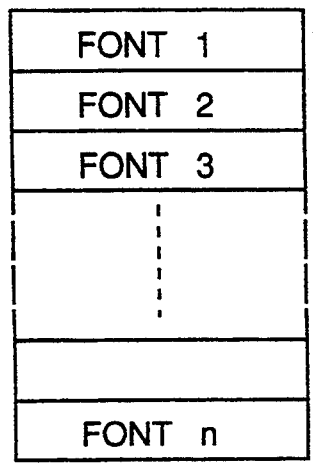
FIG. 12 is a schematic view of a memory map indicative of the organization of a font memory shown in FIG. 1.

On the other hand, during the stand-by condition for the input of the selection key 26, when the signal from the shift key 25 is inputted and a selection flag is set to "1" (step s217:YES), as shown in FIG. 4c, the selection flag is reset (step s219), and thereafter, the flickering on the decimal display 24 turns to the lighting (step s223) on condition that an empty area or areas exist in the priority register table (step s221:YES). The numerical value turned to the lighting display is registered on the priority register table (step s225), i.e., this value is determined as the attribute group number. Thereafter, the processings from step s231 to step s249 (the shifting of the variable L and the determination of the register priority "n−L") are executed.

(Register Priority "n−L")

When the initial value "1" is substituted in the variable L (step s231), a sign "[" indicative of a reception mode for the register priority and the value of the variable L flicker on the decimal display 24. As a result, the system is in the stand-by condition ready to receive a signal from the shift key 25 and that from the selection key 26.

During the stand-by condition, when the signal from the shift key 25 is inputted and the shift flag is set to "1" (step s237:YES), as shown in FIG. 4b, the shift flag is reset (step s239) and the value of the variable L is incremented by "1" (step s241). However, when the value of the variable L exceeds the registrable record number "n" of the priority register table (step s243:YES), the variable L is set to its initial value "1" again (step s231).

During the stand-by condition, when the signal from the selection key 26 is inputted and the selection flag is set to "1" (step s235:YES), as shown in FIG. 4c, the flickering (flickering of the sign "[" and the value of the variable L) on the decimal display 24 turns to the lighting (step s245). Based on the lighting variable L, the numerical value "n−L" is registered as the register priority on the priority register table (step s247). Furthermore, the selection flag is reset (step s249).

In this way, the attribute group number N and the register priority "n−L" corresponding thereto are registered on the priority register table. Thereafter, when the font key 23 is operated again, the LED 23a indicative of the font specifying mode is turned off (step s265) and the effective font retrieval processing is executed (step s267).

(2-3) Effective Font Retrieval Processing (FIGS. 8 and 9):

The effective font retrieval processing is executed at step s19 in the main routine and at step s267 in the font specifying processing (step s27).

In the effective font retrieval processing, parameters of each font listed on the FCB are successively compared with those of a font indicated by the attribute group number and listed on the attribute group table. If the former agrees with the latter, the effective font flag on the FCB is rendered to be "1". Also, the register priorities of the fonts having "effective font flag=1" are substituted in the priority register table.

Initially, the effective font flags of all the fonts on the FCB are reset to "0" (step s101). At the same time, the priorities (FCB priorities) of all the fonts are cleared to "0" (step s103). Also, an initial value "n−1" is substituted in a variable Ymin indicative of the minimum value in priority on the FCB (step s105). It is to be noted that the initial value "n−1" is the maximum value in priority.

Next, a leading address of the FCB is set to a pointer 1 (step s107) whereas that of the priority register table is set to a pointer 2 (step s109). More specifically, the first font on the FCB (FIG. 13) and that font on the attribute group table (FIG. 14) which is indicated by the first font number (attribute group number) on the priority register table (FIG. 16) are selected as the fonts of which respective parameters are compared with each other.

Then, the attribute group number designated by the pointer 2 is read (step s111). In FIG. 16, the first attribute group number to be read is "2". Furthermore, it is determined whether the attribute group number read is "0" (step s113). According to this result, the following processings are executed.

(i) The case where the attribute group number=0

At step s113, "attribute group number=0" means the case where a record area indicated thereby on the priority register table contains no data. In this case (step s113:YES), the effective font flags of all the fonts on the FCB are set to "1", and the maximum value "n−1" in priority is set as the priority of each font on the FCB.

Initially, "n−1" is set as the priority (FCB priority) of that font on the FCB which is designated by the pointer 1 (step s115). The effective font flag of this font is set to "1" (step s117). Furthermore, the FCB priority "n−1" set at step s115 is read (step s119).

Next, step s121 determines whether the FCB priority is greater than or equal to the register priority. At this stage, because the FCB priority is "n−1" and the register priority is "0", the determination at step s121 is YES, thus updating the pointer 1 (step s141).

In this way, the pointer 1 is updated whenever the above processing is terminated. As a result, the effective font flag and the priority of each font on the FCB is set to "1" and to "n−1" indicative of the maximum value, respectively.

(ii) The case where the attribute group number≠0

If that attribute group number of a record area on the priority register table which is designated by the pointer 2 is not "0" (step s113:NO), i.e., if data are registered on the priority register table, parameters of a font designated by the pointer 1 on the FCB are successively compared with those of another font indicated by the attribute group number on the attribute group table. When the former agrees with the latter, the effective font flag of the font on the FCB is rendered to be "1" and the corresponding register priority on the priority register table is substituted as the FCB priority of this font.

More specifically, the parameters of the font designated by the pointer 1 on the FCB are read (step s131) and are compared with those of the font listed on the attribute group table and indicated by the attribute group number on a record area designated by the pointer 2 (step s133). At this moment, the pointer 2 is updated (step s135).

As a result of the comparison, when both the parameters do not agree with each other (step s137:NO), the processing for comparison similar to the above is executed based on updated data designated by the pointer 2. More specifically, parameters of that font on the attribute group table which is indicated by the attribute group number on the record area designated by the updated pointer 2 are compared with those of that font on the FCB which is designated by the pointer 1 not updated.

As a result of the comparison, if both the parameters are in disagreement with each other (step s137:YES), the effective font flag of the font designated by the pointer 1 on the FCB is set to "1" (step s117). Also, the priority (FCB priority=0 (step s103)) of this font is read (step s119).

As mentioned previously, the FCB priority read at step s119 is "0". Because of this, the determination at step s121 is "NO". Accordingly, step s123 is executed, and the corresponding register priority on the priority register table (the register priority of the record area designated by the pointer 2) is set as the FCB priority of the font.

The FCB priority set as above is then compared with the variable Ymin (initial value="n−1"). If the FCB priority is less than Ymin (step s125:YES), the FCB priority is substituted in the variable Ymin (step s127). In this way, the value of the variable Ymin is successively updated to a lower value in priority on the FCB.

As described above, the effective font flag of the font listed on the FCB and designated by the pointer 1 is managed, and the FCB priority is set for all the fonts having "effective font flag=1". Furthermore, the value of the variable Ymin is updated to a lower value in priority. Thereafter, the pointer 1 is updated (step s141) and the above processing is executed for all the fonts on the FCB.

(2-4) Font Selection Processing (FIGS. 10 and 11):

The font selection processing is executed at step s43 in the main routine. In the font selection processing, fonts having respective attributes designated by the font selection code (the code transmitted from the host computer and stored in the receiving buffer) are retrieved in the order of the FCB priority from among the fonts having "effective font flag=1" for the selection of appropriate fonts.

Initially, the font selection conditions (attribute) are read out of the receiving buffer (step s301) and an initial value "n−1" is set to a variable N (step s303). The variable N is a value indicative of the priority of the fonts being currently subjected to the selection processing. This priority is hereinafter referred to as the current priority. The value of the variable N is decremented by "1" whenever one cycle of the processings is terminated (step s325).

Subsequently, the leading address of the FCB in the RAM 13 is set to a pointer required to refer to the FCB (step s305). Thereafter, the processing at steps s307 through s327 is executed. More specifically, the FCB status is read out of the RAM 13 (step s307), and the fonts having "effective font flag=1" are retrieved. In other words, until the effective font flag is rendered to be "1" at step s309, the processing of (the updating of the pointer)→(the reading of the FCB status referred to by the updated pointer) is executed (step s309:NO→step s321→step s323:NO→step s307→...).

When the retrieval of all the fonts having "effective font flag=1" is terminated, the FCB priority of the retrieved fonts is determined. As a result, if the FCB priority=N (step s311:YES), the attributes of the corresponding fonts are read (step s313). In other words, If the FCB priority of the retrieved fonts is the current priority, the attributes of the corresponding fonts are read out of the RAM 13.

If the FCB priority of the retrieved fonts is not the current priority (step s311:NO), the retrieval of the fonts having "effective font flag=1" is continued for the determination of the FCB priority of the fonts to be subsequently retrieved.

More specifically, from among the fonts having "effective font flag=1", the processing is executed so that the fonts having "FCB priority=n−1" may be first retrieved. If the fonts having "FCB priority=n−1" contains no fonts having the attributes in agreement with those designated by the font selection code (step s323:YES), the variable N is decremented (step s325). As a result, the same retrieval processing as above is executed with respect to the fonts having "FCB priority=n−2". In this way, from among the fonts having "effective font flag=1", the fonts having a higher FCB priority are retrieved for the selection of appropriate fonts.

When the attributes of the fonts are read, these attributes are compared with those designated by the font selection code. If the former and the latter are in agreement with each other (step s315:YES) and if the former are not selected up to this time (step s317:NO), selection font information is updated thereby (step s319). Thereafter, the processing is returned to the main routine.

In the above-described embodiment, a plurality of fonts are classified into a plurality of groups (1–m) having respective different attributes, as shown in the attribute group table. The priority is specified for each attribute group. Based on the priority imparted to each attribute group, the priority is further imparted to each font in the effective font retrieval processing.

The present invention, however, is not limited to the above-described embodiment, and the priority may be directly imparted to each font without the use of the attribute group table. For example, the priority may be directly inputted into an area for the FCB priority in the font management table shown in FIG. 13 by the operation of a key or the like.

As is clear from the above, according to the present invention, fonts having respective attributes to be compared at the time a font selection instruction is given are limited to the fonts of which retrieval data have been produced. Furthermore, the comparison of the attributes is performed in the order of respective retrieval levels (priorities). Because of this, the font having designated attributes is selected within a comparatively short time period.

Furthermore, it is likely that different priority data are requested for a certain font due to the fact that the font point size, the font type or the like differs. In this case, according to the present invention, the one to which higher priority data are imparted is rendered to be the priority of the font. Accordingly, of the priorities selected by the user, it is possible to employ a higher one. As a result, a desired font having an attribute designated is selected at a high speed.

Also, the production of retrieval data and the setting of retrieval levels (priorities) can be readily performed in the system according to the present invention. In other words, the font selection can be readily performed according to the user's intention.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A font management system comprising:
   a first storage means for storing a plurality of fonts each having a plurality of attributes;
   a second storage means for storing a priority imparted to each of said fonts;
   a reception means for receiving a font selection signal required to select a single font from among the plurality of said fonts, said font selection signal containing attribute information;
   a comparison means for comparing the attribute information contained in said font selection signal with attribute information stored in said first storage means in order of priorities of said fonts stored in said second storage means;
   a selection means for selecting, as a result of a comparison by said comparison means, from said first storage means a font having attribute information in agreement with the attribute information contained in said font selection signal; and
   an alteration means for rewriting said priorities of said fonts stored in said second storage means in accordance with an instruction from an operator.

2. A font management system comprising:
   a first storage means for storing a plurality of fonts each having a plurality of attributes;
   a designation means for designating some fonts from among the plurality of said fonts in accordance with an instruction from an operator;
   a reception means for receiving a font selection signal required to select a single font from among the plurality of said fonts, said font selection signal containing attribute information;
   a comparison means for comparing the attribute information contained in said font selection signal with attributes of said fonts designated by said designation means, a comparison by said comparison means being not carried out with respect to fonts that have not been designated by said designation means; and a selection means for selecting, as a result of the comparison by said comparison means, a font having attribute information in agreement with the attribute information contained in said font selection signal.

3. A font management system comprising:

a first storage means for storing a plurality of fonts each having a plurality of attributes;

a designation means for designating some fonts from among the plurality of said fonts in accordance with an instruction from an operator;

a second storage means for storing a priority imparted to each of said fonts designated by said designation means;

a reception means for receiving a font selection signal required to select a single font from among the plurality of said fonts, said font selection signal containing attribute information;

a comparison means for comparing the attribute information contained in said font selection signal with attributes of said fonts designated by said designation means in order of priorities of said fonts stored in said second storage means, a comparison by said comparison means being not carried out with respect to fonts that have not been designated by said designation means;

a selection means for selecting, as a result of a comparison by said comparison means, a font having attribute information in agreement with the attribute information contained in said font selection signal; and an alteration means for rewriting said priorities of said fonts stored in said second storage means in accordance with the instruction from the operator.

4. A font management system comprising:

a first storage means for storing a plurality of fonts each having a plurality of attributes;

a second storage means for storing attribute information of each font, a priority imparted to each font, and an address of each font in said first storage means;

a reception means for receiving a font selection signal required to select a single font from among the plurality of said fonts, said font selection signal containing attribute information;

a comparison means for comparing the attribute information contained in said font selection signal with the attribute information stored in said second storage means in order of priorities of said fonts stored in said second storage means;

a retrieval means for retrieving attribute information in agreement with the attribute information contained in said font selection signal;

a selection means for selecting a font having the attribute information retrieved by said retrieval means from among the fonts stored in said first storage means in compliance with addresses stored in said second storage means; and an alteration means for rewriting said priorities of said fonts stored in said second storage means in accordance with an instruction from the operator.

5. A font management system comprising:

a first storage means for storing a plurality of fonts each having a plurality of attributes;

a classification means for classifying the plurality of fonts into a plurality of groups in accordance with an instruction from an operator, a classification by said classification means being alterable by the instruction from the operator;

a priority imparting means for imparting a priority to each group classified by said classification means;

a reception means for receiving a font selection signal required to select a single font from among the plurality of said fonts, said font selection signal containing attribute information;

a comparison means for comparing the attribute information contained in said font selection signal with attribute information stored in said first storage means in order of priorities imparted by said priority imparting means; and a selection means for selecting, as a result of a comparison by said comparison means, from said first storage means, a font having attribute information in agreement with the attribute information contained in said font selection signal.

6. A font management system comprising:

a first storage means for storing a plurality of fonts each having a plurality of attributes;

a classification means for classifying the plurality of fonts into a plurality of groups in accordance with an instruction from an operator, a classification by said classification means being alterable by the instruction from the operator;

a priority imparting means for imparting a priority to each group classified by said classification means, a same priority being imparted to a plurality of fonts contained in a same group;

a reception means for receiving a font selection signal required to select a single font from among the plurality of said fonts, said font selection signal containing attribute information;

a comparison means for comparing the attribute information contained in said font selection signal with attribute information stored in said first storage means in order of priorities imparted by said priority imparting means; and a selection means for selecting, as a result of a comparison by said comparison means, from said first storage means, a font having attribute information in agreement with the attribute information contained in said font selection signal.

7. The system according to claim 6, wherein said classification means classifies the plurality of fonts into the plurality of groups in compliance with contents of the attributes.

8. The system according to claim 7, wherein, as a result of a classification by said classification means, when one font is classified into a plurality of groups, a priority imparted to said one font is higher than any other priorities in each group to which said one font belongs.

9. A font management system comprising:

a first storage means for storing a plurality of fonts each having a plurality of attributes;

a first priority imparting means for imparting a first priority to the fonts having some common attributes in the plurality of attributes in accordance with an instruction from an operator;

a second priority imparting means for imparting a second priority to the fonts having some other common attributes in accordance with the instruction from the operator, said first and second priorities being alterable by the instruction from the operator;

a reception means for receiving a font selection signal required to select a single font from among the plurality of said fonts, said font selection signal containing attribute information;

a comparison means for comparing the attribute information contained in said font selection signal with attributes of the fonts having respective priorities imparted by said first or second priority imparting means in order of priorities imparted; and a selection means for selecting, as a result of a comparison by said comparison means, a font having attributes in agreement with the attribute information contained in said font selection signal.

10. The system according to claim 9, wherein, when a font having a priority imparted by said first priority imparting means is the same as another font having a priority imparted by said second priority imparting means, a higher priority is imparted to said font.

* * * * *

UNITED STATES PATENT AND TRADEMARK OFFICE
CERTIFICATE OF CORRECTION

PATENT NO. : 5,410,640
DATED : April 25, 1995
INVENTOR(S) : Takashi MORIKAWA et al It is certified that error appears in the above-indentified patent and that said Letters Patent is hereby corrected as shown below:

On title page, item [75], delete "Takashi Morikawa; Yoshikazu Ikenoue, both of Toyohashi, Japan" and insert -- Takashi Morikawa, Toyokawa; Yoshikazu Ikenoue, Toyohashi, both of Japan --.

Signed and Sealed this

Eighteenth Day of July, 1995

Attest:

BRUCE LEHMAN

*Attesting Officer*     *Commissioner of Patents and Trademarks*